(12) United States Patent
Winters et al.

(10) Patent No.: US 10,954,730 B1
(45) Date of Patent: Mar. 23, 2021

(54) PRESSURE CONTROL FOR GATE-VALVE AND HOT-TAP DRILLING SYSTEMS

(71) Applicant: QES PRESSURE CONTROL LLC, Oklahoma City, OK (US)

(72) Inventors: Steve Winters, Oklahoma City, OK (US); Bernt Olsen, Edmond, OK (US)

(73) Assignee: QES PRESSURE CONTROL LLC, Oklahoma City, OK (US)

( * ) Notice: Subject to any disclaimer, the term of this patent is extended or adjusted under 35 U.S.C. 154(b) by 70 days.

(21) Appl. No.: 16/434,485

(22) Filed: Jun. 7, 2019

(51) Int. Cl.
*E21B 21/10* (2006.01)
*E21B 21/08* (2006.01)

(52) U.S. Cl.
CPC ............ *E21B 21/106* (2013.01); *E21B 21/08* (2013.01)

(58) Field of Classification Search
CPC ....................................................... E21B 33/08
See application file for complete search history.

(56) References Cited

U.S. PATENT DOCUMENTS

| | | | |
|---|---|---|---|
| 3,374,521 A | 3/1968 | Clarke | |
| 4,369,845 A | 1/1983 | Henson et al. | |
| 5,636,688 A * | 6/1997 | Bassinger | E21B 33/08 |
| | | | 166/176 |
| 5,975,212 A | 11/1999 | Johnston | |
| 7,607,383 B2 | 10/2009 | Nagel | |
| 7,722,298 B2 | 5/2010 | Russell | |
| 8,100,181 B2 | 1/2012 | Jones et al. | |
| RE46,241 E | 12/2016 | Cain et al. | |
| 2009/0101359 A1 | 4/2009 | Kauffman et al. | |
| 2018/0058621 A1 | 3/2018 | Restivo et al. | |

FOREIGN PATENT DOCUMENTS

| | | |
|---|---|---|
| CA | 1318245 | 5/1993 |
| CA | 2585123 | 6/1999 |

* cited by examiner

*Primary Examiner* — Kristyn A Hall
(74) *Attorney, Agent, or Firm* — McAfee & Taft

(57) ABSTRACT

A gate-valve and/or hot-tap drilling system uses a secondary pack-off or sealing element which can be engaged when the primary sealing element develops a leak. Generally, the secondary sealing element is configured to have an engaged position in which a fluid tight seal is formed such that the secondary sealing element engages the bore wall in a pressure-containing housing and drill rod extending through the bore defined by the bore wall. The fluid tight seal prevents fluid flow in the annulus, if the primary seal develops a leak. When the primary seal is working normally—no fluid leak—the secondary sealing element is in a disengaged position where a fluid tight seal is not formed with the bore wall and drill rod.

15 Claims, 4 Drawing Sheets

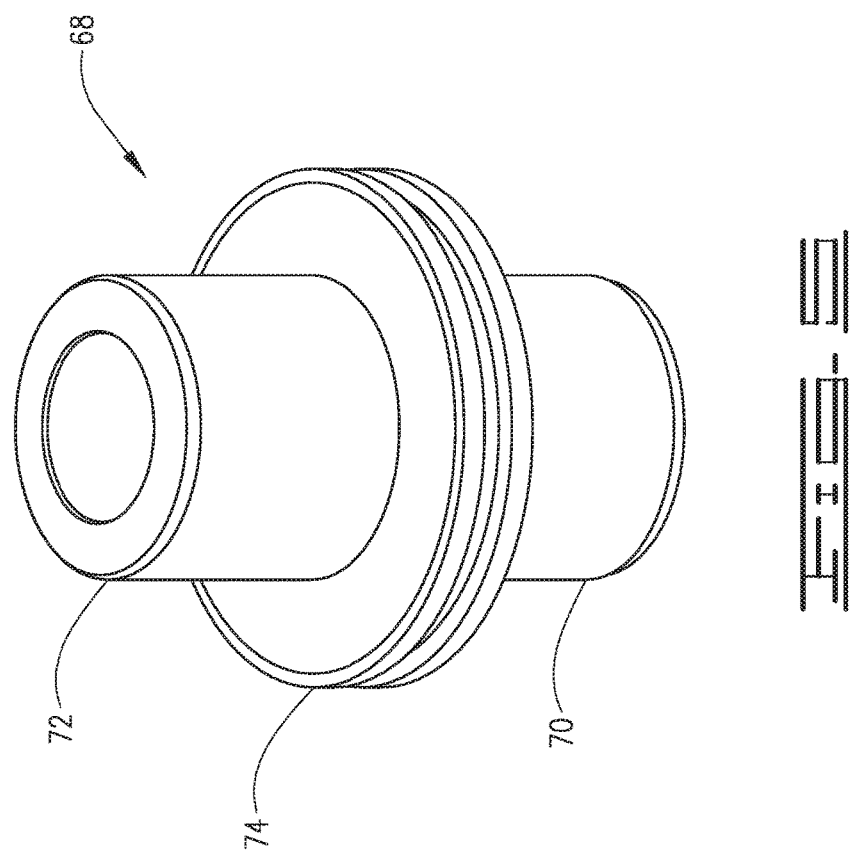
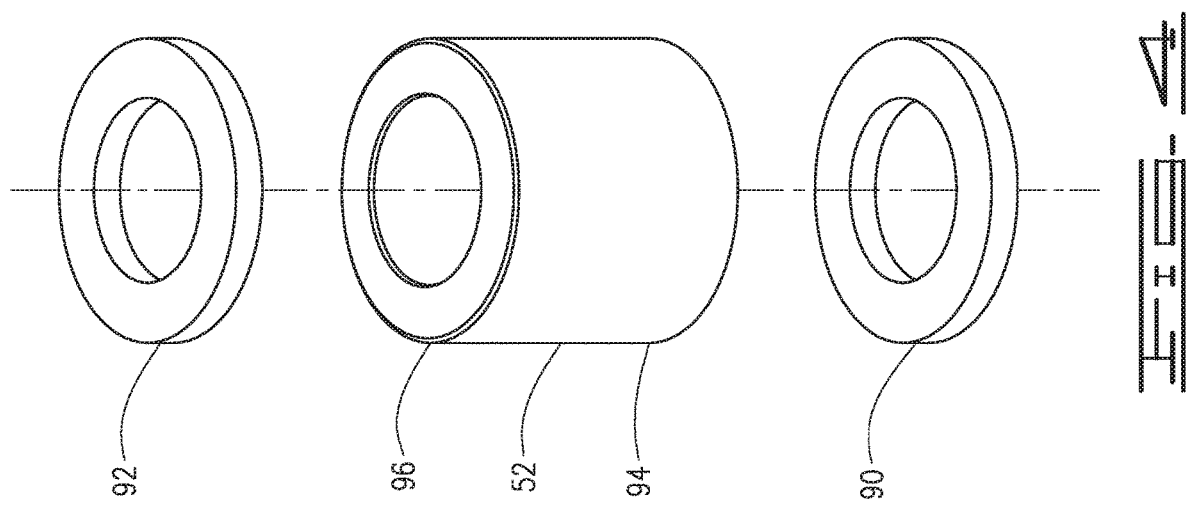

PRESSURE CONTROL FOR GATE-VALVE AND HOT-TAP DRILLING SYSTEMS

FIELD

The present disclosure relates generally to apparatuses and methods for cutting into workpieces under pressure, such as pipes carrying pressurized fluids and/or closed gate valves that have seized in the closed or partially closed position, and more particularly to preventing a flow of pressurized fluid along the outside of a drill rod of such apparatuses.

BACKGROUND

In the oil and gas industry—as well as other industries—there is a need to make new connections to pressurized conduits without having to depressurize the conduit. Further, there is a need to drill through the closing elements of valves seized up in the closed or partially closed position, to thus gain access to the fluid volume in the conduit. Gate-valve and/or hot-tap drilling is a procedure that makes a new connection to the fluid volume in the conduit while the conduit remains in service.

For example, in natural gas transmission and distribution, new connections to pipelines are needed to expand or modify the existing systems, and sometimes seized-up gate valves must be drilled out to reestablish flow. Without gate-valve and/or hot-tap drilling, such new connections necessitate shutting down a portion of the system and purging the gas to ensure a safe connection. This procedure results in methane emissions, loss of product and sales, and inconvenience and costs associated with evacuating existing piping systems. With gate-valve or hot-tap drilling, the connection can be made while the pipeline remains in service. The hot-tap drilling procedure involves attaching a branch connection and valve on the outside of the operating pipeline, and then cutting out the pipeline wall within the branch and removing the wall section through the valve. Similarly, gate-valve drilling procedure provides access to the fluid volume in the pipeline through a closed valve where the closing element has seized in the closed position. After drilling through the valve closing element, any pressure can be bled off or fluid can be bumped in, as desired, in order to remedy the situation. Thus, gate-valve and hot-tap drilling avoids product loss, methane emissions and disruption of service to customers.

Dealing with high-pressure conditions, which can be up to 15,000 psi or more, can be problematic with current machines. Traditional hot-tap drilling machines mount their motors externally and extend their drive shafts through a sealing element in a pressure containing housing. In the event that the sealing element develops leaks, hazards occur due to leakages of high-pressure fluids which contain high energy, and can be flammable and thus have the potential of causing personnel damage, equipment damage and polluting the environment.

Accordingly, there is a need for a safe configuration that prevents hazardous leaks in high-pressure hot tapping procedures but allows efficient operation of the drilling system.

SUMMARY

This disclosure generally concerns gate-valve drilling and hot-tap drilling systems and specifically provides for a secondary pack-off or sealing element which can be engaged to prevent flow along the outside of the drill rod, such as when the primary sealing element develops a leak. Generally, the secondary sealing element is not used for drilling operations but is used only to mitigate the leak in the primary sealing element until it can be repaired. Thus, in such embodiments, the secondary sealing element is typically only engaged when the primary sealing element develops a leak.

More specifically, in accordance with one series of embodiments of the current disclosure, there is provided a combined gate-valve drilling and hot-tap drilling system comprising a pressure-containing housing, a drill rod, a primary sealing element and a secondary sealing element. The pressure-containing housing has a bore wall defining a bore. The drill rod extends through the bore so as to define an annulus between the drill rod and the bore wall. The primary sealing element is configured to engage the bore wall and drill rod in a fluid tight seal so as to prevent fluid flow through the annulus. The secondary sealing element is configured to have an engaged position in which a fluid tight seal is formed such that the secondary sealing element engages the bore wall and drill rod so as to prevent fluid flow in the annulus. The secondary sealing element also has a disengaged position where a fluid tight seal is not formed with the bore wall and drill rod.

Generally, the housing has a first end configured to be connected to a workpiece (such as a pipe or gate valve) on which drilling is being performed, and a second end configured to attach to a drilling machine such that the drill rod of the drilling machine extends through the bore.

In some embodiments, a piston sleeve is used to move the secondary sealing element from the normally disengaged position to the engaged position. Typically, the secondary sealing element is an elastic element, which under longitudinal pressure, longitudinally compresses and radially expands, and when the longitudinal pressure is removed, longitudinally decompresses and radially contracts. Thus, the piston sleeve, which is positioned in the bore and surrounds the drill rod, is configured to move longitudinally along the bore from a first position to a second position. In the second position, the piston engages with the secondary sealing element so as to place the secondary sealing element in the engaged position—longitudinally compressed and radially expanded so as to create a fluid tight seal with the bore wall and drill rod. In the first position, the piston allows the secondary sealing element to be in the disengaged position—longitudinally decompressed and radially contracted so that it does not form a fluid tight seal with the bore wall and drill rod.

In some of these embodiments, the piston sleeve is held in the first position by a first fluid pressure on a first portion of the piston sleeve. Further, the piston can be moved from the first position to the second position by reducing the first fluid pressure on the first portion and by increasing a second fluid pressure on a second portion of the piston. The first fluid pressure and second fluid pressure can be hydraulic pressure or pneumatic pressure.

Typically, the first and second fluid pressures are controlled by flow through a first external port and second external port in the housing, respectively. Thus, the first external port is configured to allow fluid flow to the first portion of the piston so as to allow the first fluid pressure to be increased and decreased, and the second external port is configured to allow fluid flow to the second portion of the piston so as to allow the second fluid pressure to be increased and decreased.

In accordance with another series of embodiments, this disclosure provides for a method of drilling, using one of the gate-valve and/or hot-tap drilling systems described above. The method comprises;

commencing drilling with the drilling system on a workpiece, wherein the workpiece contains a fluid at an elevated pressure that is higher than atmospheric pressure, monitoring the primary sealing element to determine if the primary sealing element is leaking so as to allow fluid flow through the annulus; and moving the secondary sealing element to the engaged position when the monitoring determines that the primary sealing element is leaking.

The method can include, prior to commencing drilling, connecting a first end of the housing to a workpiece on which drilling is being performed and connecting a second end to a drilling machine such that the drill rod of the drilling machine extends through the bore.

BRIEF DESCRIPTION OF THE DRAWINGS

FIG. 4 is an exploded perspective view of the sealing element and anti-extrusion rings in the pressure containing housing of FIG. 3

FIG. 5 is a perspective view of piston shown in the pressure containing housing of FIG. 3.

DETAILED DESCRIPTION

Figure 1:
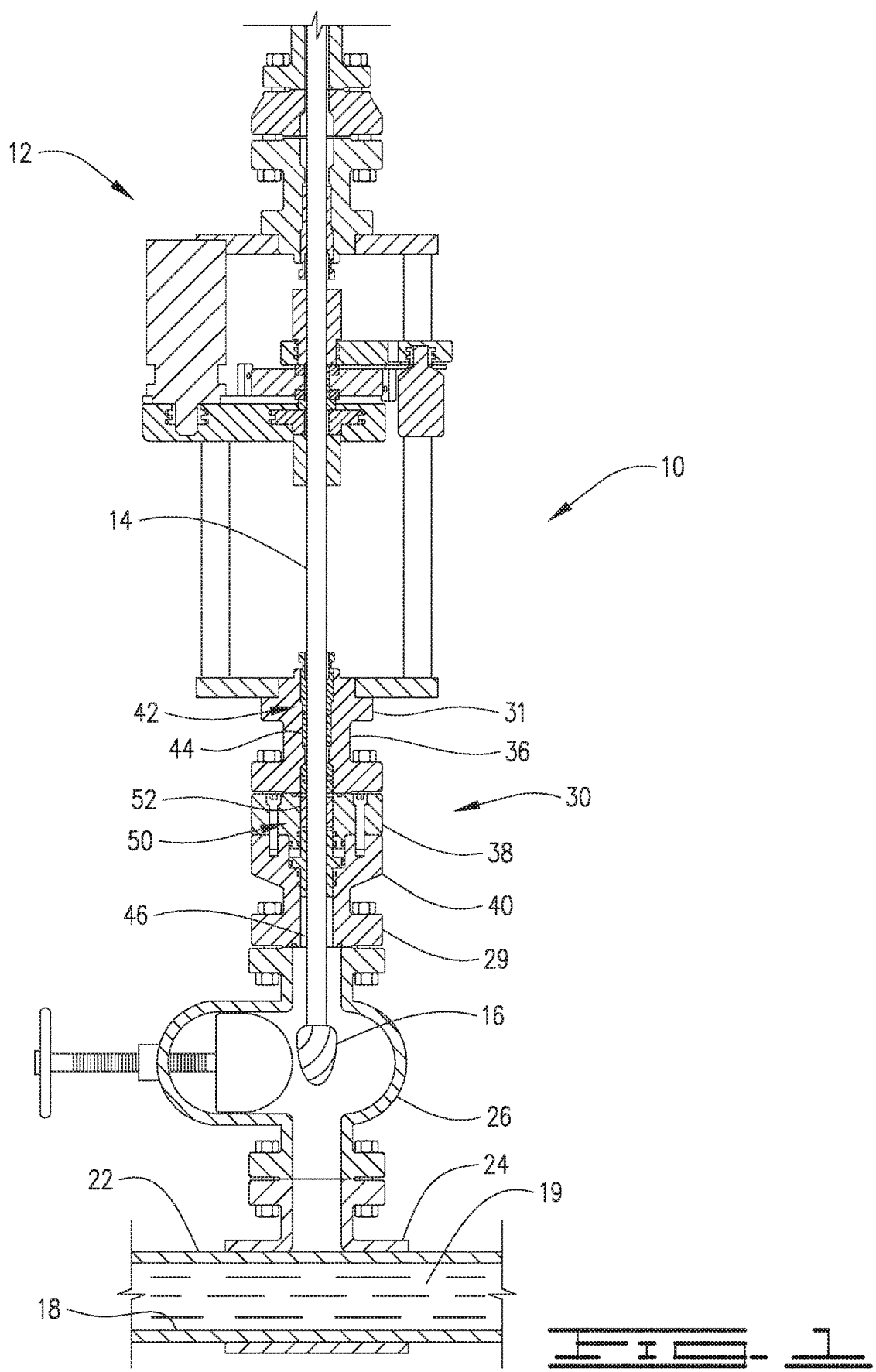
FIG. 1 is a schematic representation of a hot-tapping drilling system in accordance with this disclosure shown connected to a valve and pipeline.

In the description that follows, like parts are marked throughout the specification and drawings with the same reference numerals, respectively. The drawings are not necessarily to scale and the proportions of certain parts have been exaggerated to better illustrate details and features of the invention. In the following description, the terms "inwardly" and "outwardly" are directions toward and away from, respectively, the geometric axis of a referenced object. Where components of relatively well-known designs are employed, their structure and operation will not be described in detail.

The embodiments described herein generally relate to gate-valve and/or hot-tap drilling systems, and while are applicable to any such operations performed on a workpiece (conduit, pipeline, gate valve, etc.) containing a fluid above atmospheric pressure, they are particularly useful for high-pressure operations. "High-pressure operations" generally refer to drilling operations where workpieces contain a fluid at above 100 psia, and more typically above about 500 psia, above 1000 psia or even above 5000 psia. In some cases, the pressures can be above 10,000 psia and can even be up to 15,000 psia or above.

The drilling system of this disclosure provides for a secondary pack-off or sealing element which can be engaged when the primary sealing element (primary pack-off) develops a leak. Generally, the secondary sealing element is not used for drilling operations but is used to mitigate the leak until the primary sealing element can be repaired.

Referring now to FIG. 1, there is shown a drilling system 10, which utilizes a secondary sealing element in accordance with this disclosure. Drilling system has a drilling machine 12, which comprises a mechanically driven telescoping boring bar or drill rod 14 that terminates in a cutting tool 16. The cutting tool 16 is used to bore a hole into the workpiece wall, shown as pipeline 18. While illustrated with pipeline 18 as the workpiece, those skilled in the art will realize the applicability of the disclosed system to other workpieces. For example, the workpiece could be a valve. Commonly, the closing element of such valves must be drilled out where the valve has seized up and is inoperable.

As illustrated in FIG. 1, drill rod 14 and cutting tool 16 extend through a valve 26, which has been attached to the pipeline 18 by a fitting 24. Fitting 24 is illustrated as a full-encirclement split-sleeve tee, which wraps completely around pipeline 18 and provides mechanical reinforcement of pipeline 18. As will be understood, during hot-tapping operations, pipeline 18 will contain a fluid 19, which is at an elevated pressure; that is, the fluid 19 is above atmospheric pressure and, more typically is at a high-pressure as described above.

Valve 26 is illustrated as connected to fitting 24 but not yet in fluid flow communication with the interior of pipeline 18. System 10 has been attached to valve 26 and is configured to drill through pipe wall 22 of pipeline 18. When drilling is complete, the gate valve can be in fluid flow with the interior of pipeline 18 and can control flow through the T-section created by fitting 24. Valve 26 can be a ball valve or gate valve, for example. While illustrated in relation to pipeline 18 and gate valve 26, the hot-tapping system 10 can be readily adapted for other drilling operations, and specifically high-pressure operations.

Drilling system 10 includes a pressure-containing housing 30 suitable for the high-pressures operations. Typically, pressure-containing housing 30 is configured to attach at a first end 29 to a workpiece (such as valve 26, fitting 24 and pipeline 18) and at a second end 31 to drilling machine 12. Pressure containing housing 30 has a bore wall 32 defining a bore 34 through which drill rod 14 passes (best seen in FIG. 3). As illustrated, pressure-containing housing 30 comprises three connected housing pieces: upper housing piece 36, middle housing piece 38 and lower housing piece 40. Upper housing piece 36 contains the primary pack-off 42, which includes primary sealing element 44. During normal drilling operations, primary sealing element 44 sealingly engages drill rod 14 and bore wall 32 sufficiently to prevent fluid flow through annulus 46. That is, primary sealing element 44 sealingly engages drill rod 14 and bore wall 32 so as to prevent fluid 19 from pipeline 18 from passing up through the annulus 46 between drill rod 14 and bore wall 32. Primary sealing element 44 is configured to prevent such flow for high-pressure operations, which in some embodiments are up to 15,000 psi or more.

Middle housing piece 38 and lower housing piece 40 contain the secondary pack-off 50, which includes a secondary sealing element 52. During normal operation, secondary pack-off 50 in a disengaged position in which secondary sealing element 52 does not sealingly engage drill rod 14 and bore wall 32 sufficiently to prevent fluid flow in annulus 46. However, secondary pack-off 50 also has an engaged position in which secondary sealing element 52 does sealingly engage drill rod 14 and bore wall 32 sufficiently to prevent fluid flow; that is, sealing element 52 sealingly engages drill rod 14 and bore wall 32 so as to prevent fluid 19 from pipeline 18 from passing up through the annulus 46 between drill rod 14 and bore wall 32. Secondary sealing element 52 is configured to prevent such flow for high-pressure operations, which in some embodiments can be at pressures up to 15,000 psi or more.

Figure 2:
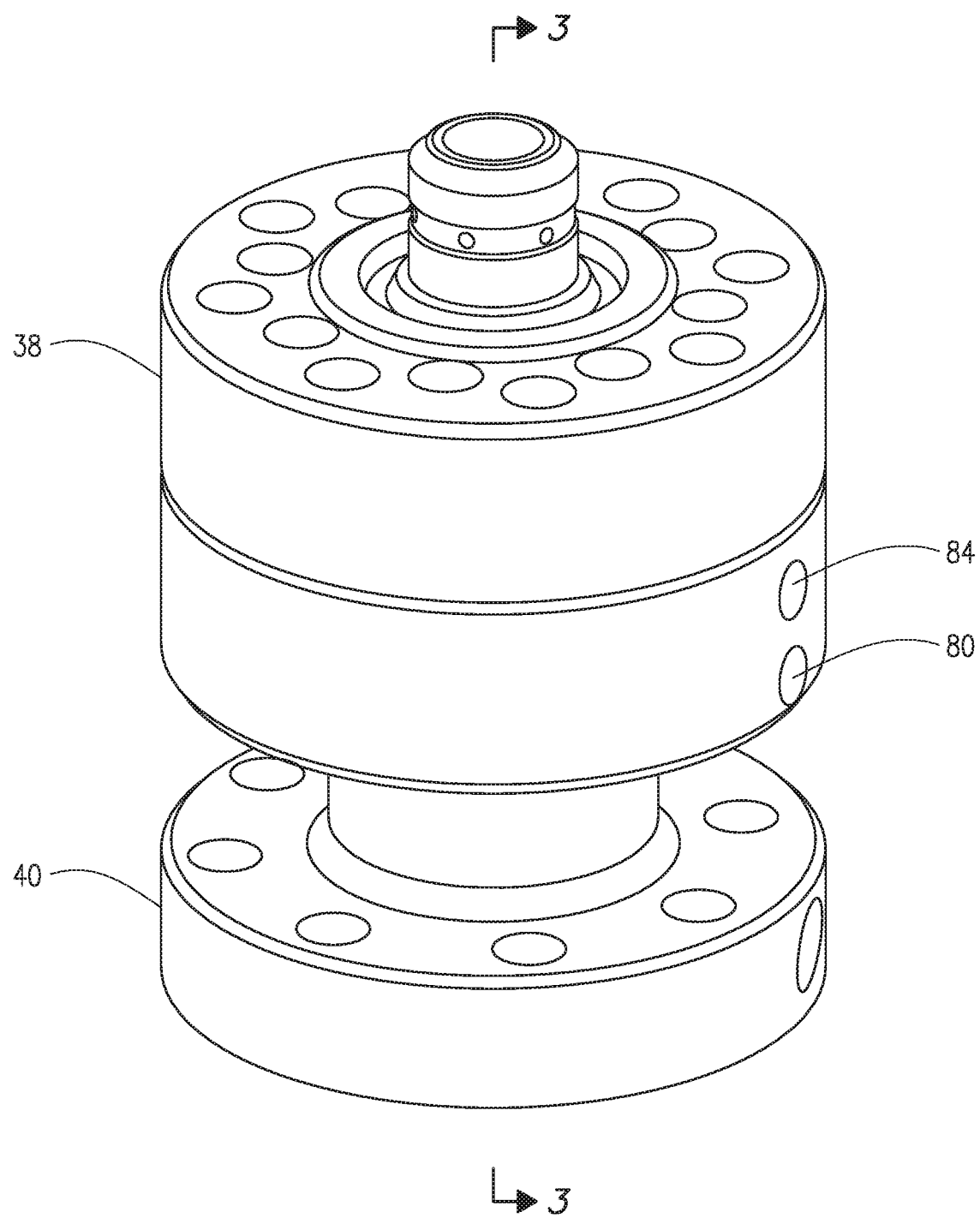
FIG. 2 is a perspective view of a pressure containing housing in accordance with one embodiment.
Figure 3:
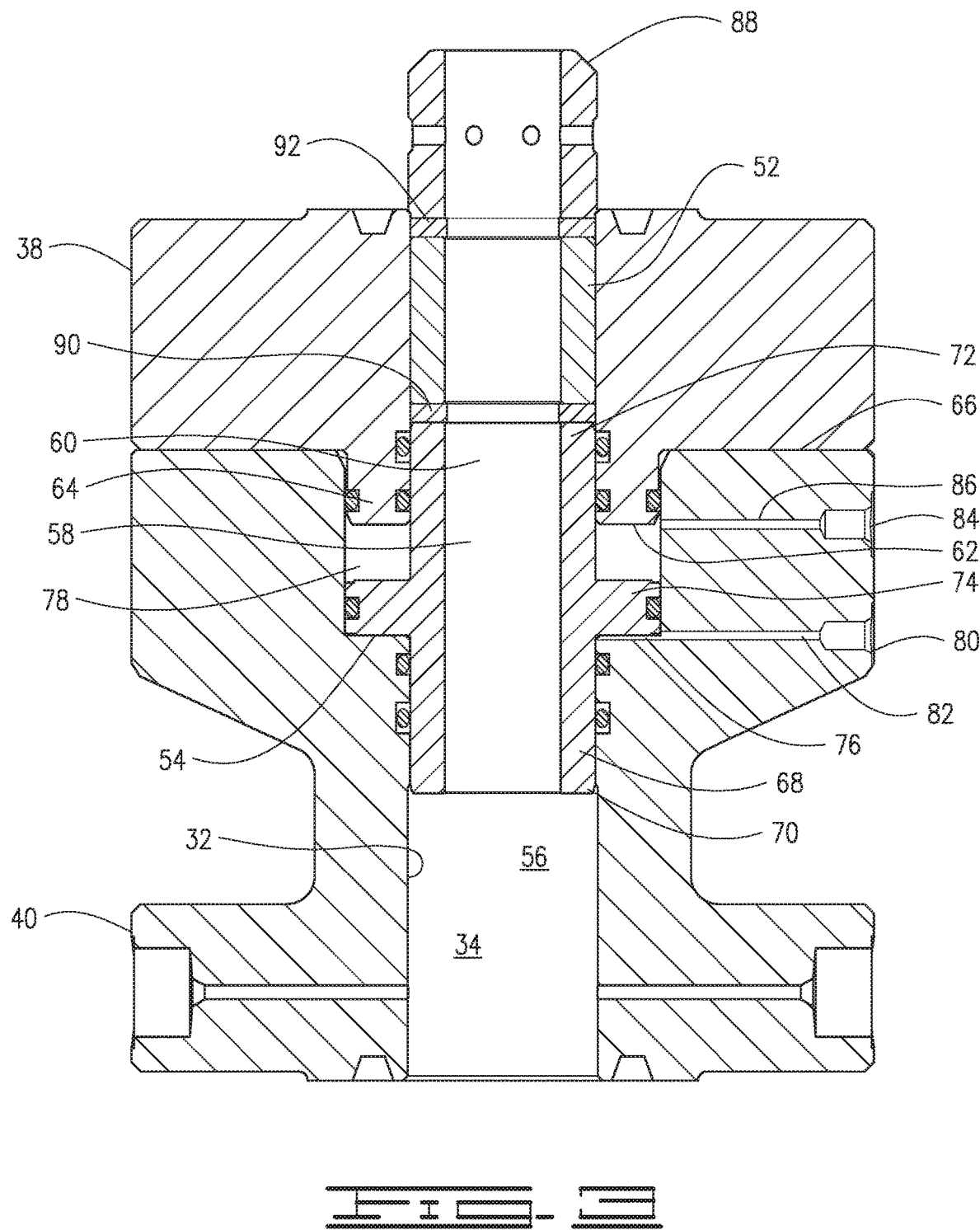
FIG. 3 is a cross-sectional view of the pressure containing housing of FIG. 2.

Turning now to FIGS. 2 and 3, one embodiment of the configuration of primary pack-off 50 will be further described. As illustrated, the portion of bore wall 32 extending through lower housing piece 40 is configured to have a first shoulder 54 so as to define a first bore chamber or zone 56 and a second bore chamber or zone 58. Second bore chamber 58 has a larger radius than first bore chamber 56. Further, the portion of bore wall 32 extending through middle housing piece 38 is configured to define a third bore chamber or zone 60, which has a radius less than second bore chamber 58, and typically a radius that is equal to first bore chamber 56. Thus, the portion of bore wall 32 extending through middle housing piece 38 forms a second shoulder 62 where it meets second bore chamber 58. As will be realized, second shoulder 62 opposes first shoulder 54. Further, as illustrated, middle housing piece 38 is formed to have wall section 64 jutting out from surface 66 so that wall section 64 extends into second bore chamber 58. Wall section 64 can aid in sealing together middle housing piece 38 and lower housing piece 40 in a fluid tight seal.

As best seen from FIGS. 3 and 5, a piston 68 is positioned within second bore chamber 58, and has a first end 70 extending into first bore chamber 56 and a second end 72 extending into third bore chamber 60. When connected to drilling machine 12, piston 68 is positioned around and in sliding relation with drill rod 14 so as to be able to slide longitudinally along drill rod 14. Piston 68 further includes a ring section 74 having a greater diameter than first end 70 or second end 72. Ring section 74 is positioned within second bore chamber 58 and contacts first shoulder 54 when piston 68 is slid downward and further into lower housing piece 40, and contacts second shoulder 62 when piston 68 is slid upwards and further into middle housing piece 38. Thus, the movement of piston 68 is confined by ring section 74. Further, ring section 74 sealingly engages the portion of bore wall 32 extending through second bore chamber 58, first end 70 can sealingly engage the portion of bore wall 32 extending through first bore chamber 56, and second end 72 can sealingly engage the portion of bore wall 32 extending through third bore chamber 60. Accordingly, a first fluid-tight chamber 76 is formed between ring section 74 and first shoulder 54 and a second fluid-tight chamber 78 is formed between ring section 74 and second shoulder 62.

As best seen from FIG. 3, lower housing piece 40 has a first port 80 and a second port 84. A first fluid-flow channel 82 extends from first port 80 to first fluid-tight chamber 76, and a second fluid-flow channel 86 extends from second port 84 to second fluid-tight chamber 78. Thus, fluid can be introduced or withdrawn from first and second fluid-tight chambers 76, 78 through first and second ports 80, 84, respectively, so as to change the relative pressure in first and second fluid-tight chambers 76, 78. By changing the relative pressures in the two fluid-tight chambers, piston 68 can be moved longitudinally to between an upper position and a lower position.

As most easily seen from FIGS. 3 and 4, a secondary sealing element 52 is positioned in third chamber/zone 60 above second end 72 of piston 68. A cap piece 88 engages middle housing piece 38 above secondary sealing element 52 and prevents upward movement of secondary sealing element 52 in bore 34. Cap piece 88 extends into and is held in place by upper housing piece 36. Additionally, a first anti-extrusion ring 90 and a second anti-extrusion ring 92 can be positioned at first end 94 and second end 96 of secondary sealing element 52 to prevent extrusion of secondary sealing element 52 in annulus 46.

Secondary sealing element 52 is made of resilient, elastic material such as rubber or other resilient wear resistant material. Anti-extrusion rings 90 and 92 are typically made of metal (such as brass) or a hard plastic (such as Polytetrafluoroethylene—marketed as Teflon™ by Chemours Company—or Polyetheretherketone (PEEK). Piston 68 can be made from various metals (such as steel or brass).

When piston 68 is moved to its upper position, it applies pressure—generally and axial or longitudinal pressure—on secondary sealing element 52 so as to longitudinally compress secondary sealing element 52, which will radially expand in response to the longitudinal compression. The radial expansion places secondary sealing element 52 in sealing engagement with drill rod 14 and bore wall 32 so as to prevent fluid flow through annulus 46. When piston 68 is in its lower position the pressure is released and secondary sealing element 52 longitudinally decompresses and radially contracts; thus, secondary sealing element 52 is not in sealing engagement with drill rod 14 and bore wall 32. Thus, movement of piston 68 defines the engaged position of secondary pack-off 50 (piston 68 in upper position) and the disengaged position of secondary pack-off 50 (piston 68 in lower position). It will be understood that upper and lower are used for convenience and the secondary pack off could be designed to work in the opposite configuration.

For further understanding, a drilling operation using the apparatuses and methods of this disclosure will now be explained. Typically, the drilling machine 12, pressure-containing housing 30, a workpiece (such as valve 26, fitting 24 and pipeline 18) will be connected together such that pressure containing housing 30 is connected to and positioned between drilling machine 12 and the workpiece, with drill rod 14 extending through pressure-containing housing 30. The workpiece will typically contain a pressurized fluid during the drilling operations, and more typically, the drilling operations will be a high-pressure operation.

Drilling is then commenced on the workpiece with the secondary sealing element 52 in the disengaged position. For example, the secondary sealing element can be placed in the disengaged position by have a higher fluid pressure in second fluid-tight chamber 78 than in first fluid-tight chamber 76. The pressures can be regulated by pneumatic or hydraulic means through first port 80 and second port 84. However, in some embodiments, piston 68 will be biased to the disengaged position by a spring or similar. In such embodiments, the piston will remain in the disengaged position until sufficient fluid pressure is supplied through first port 80 to overcome the bias and compress secondary sealing element 52. Further, some of these embodiments may not use second port 84 and second fluid-flow channel 86.

During drilling, the primary sealing element is monitored to determine if it is leaking so as to allow fluid flow through the annulus between the drill rod and the bore wall of the pressure-containing housing. When a leak is detected, the secondary seal is moved to the engaged position to stop the flow of fluid through the annulus. For example, the fluid flow through first port 80 can be increased so as to increase fluid pressure in first fluid-tight chamber 76, and/or fluid can be allowed to flow out of second fluid-tight chamber 78 through second port 84 so as to reduce the fluid pressure in second fluid-tight chamber 78. The resulting change in fluid pressure between first fluid-tight chamber 76 and second fluid-tight chamber 78 results in movement of piston 68 towards secondary sealing element 52. Once the pressure differential between chambers 76 and 78 reaches a predetermined amount, the secondary sealing element 52 will compress and radially expand sufficiently to create a fluid tight seal to stop flow of fluid through annulus 46.

Generally, the drilling will be stopped either before or after moving the secondary sealing element to the engaged position. Subsequently, the operator can pull the drill rod and cutting tool out of valve 26 and close valve 26 so as to isolate pressure-containing housing 30 from the pressurized fluid 19 in the workpiece, shown as pipeline 18. The pressure within pressure-containing housing 30 can be bled off. The operator can then safely repair primary pack-off 42 so that it makes a suitable seal with drill rod 14. Once the repair is completed, drilling can recommence. While some designs might utilize secondary pack-off 50 during normal drilling operations; more typically, the secondary pack-off will not be used to seal against fluid flow in annulus 46 during normal drilling operations but only to prevent leakage during shutting down operations when primary pack-off 42 leaks fluid, and/or when drill rod 14 is pulled back past the valve 26.

The above elements of the drilling system as well as others can be seen with reference to the figures. From the above description and figures, it will be seen that the present invention is well adapted to carry out the ends and advantages mentioned, as well as those inherent therein. While the presently preferred embodiment of the apparatus has been shown for the purposes of this disclosure, those skilled in the art may make numerous changes in the arrangement and construction of parts. All of such changes are encompassed within the scope and spirit of the appended claims.

What is claimed is:

1. A drilling system for use in gate-valve drilling, hot-tap drilling or both, the drilling system comprising:
   a pressure-containing housing having a bore wall defining a bore;
   a drill rod extending through the bore so as to define an annulus between the drill rod and the bore wall;
   a primary sealing element configured to engage the bore wall and drill rod in a fluid tight seal so as to prevent fluid flow through the annulus;
   a secondary sealing element configured to have an engaged position in which a fluid tight seal is formed such that the secondary sealing element engages the bore wall and drill rod so as to prevent fluid flow in the annulus and a disengaged position where a fluid tight seal is not formed with the bore wall and drill rod; and
   a piston sleeve positioned in the bore and surrounding the drill rod, wherein the piston sleeve is configured to move longitudinally along the bore from a first position to a second position, and wherein in the second position, the piston sleeve engages with the secondary sealing element so as to place the secondary sealing element in the engaged position, and wherein in the first position, the piston sleeve allows the secondary sealing element to be in the disengaged position, and wherein the piston sleeve is held in the first position by a first fluid pressure on a first portion of the piston sleeve.

2. The drilling system of claim 1, wherein the housing has a first end configured to be connected to a workpiece on which drilling is being performed, and a second end configured to attach to a drilling machine such that the drill rod of the drilling machine extends through the bore.

3. The drilling system of claim 1, wherein the secondary sealing element is an elastic element, which under longitudinal pressure, longitudinally compresses and radially expands, and when the longitudinal pressure is removed, longitudinally decompresses and radially contracts.

4. The drilling system of claim 3, wherein in the first position, the piston sleeve applies pressure to the secondary sealing element sufficient to longitudinally compress and radially expand the secondary sealing element thus placing the secondary sealing element into the engaged position, and in the second position, the piston sleeve allows the secondary sealing element to be in the disengaged position.

5. The drilling system of claim 4, wherein the piston sleeve is moved from the first position to the second position by reducing the first fluid pressure on the first portion and by increasing a second fluid pressure on a second portion of the piston sleeve.

6. The drilling system of claim 5, wherein the housing further comprises a first port and a second port, and wherein the first port is configured to allow fluid flow to the first portion of the piston sleeve so as to allow the first fluid pressure to be increased and decreased, and the second port is configured to allow fluid flow to the second portion of the piston sleeve so as to allow the second fluid pressure to be increased and decreased.

7. The drilling system of claim 6, wherein the housing has a first end configured to be connected to a workpiece on which drilling is being performed, and a second end configured to attach to a drilling machine such that the drill rod of the drilling machine extends through the bore.

8. A method of drilling, the method comprising;
   commencing drilling with a drilling system on a workpiece, wherein the workpiece contains a fluid at an elevated pressure that is higher than atmospheric pressure, the drilling system comprising:
      a pressure-containing housing having a bore wall defining a bore;
      a drill rod extending through the bore so as to define an annulus between the drill rod and the bore wall;
      a primary sealing element configured to engage the bore wall and drill rod in a fluid tight seal so as to prevent the fluid from flowing through the annulus;
      a secondary sealing element configured to have an engaged position in which a fluid tight seal is formed such that the secondary sealing element engages the bore wall and drill rod so as to prevent the fluid from flowing in the annulus and a disengaged position where a fluid tight seal is not formed with the bore wall and drill rod, and wherein drilling is commenced with the secondary sealing element in the disengaged position;
   monitoring the primary sealing element to determine if the primary sealing element is leaking so as to allow fluid flow through the annulus; and
   moving the secondary sealing element to the engaged position when the monitoring determines that the primary sealing element is leaking.

9. The method of claim 8, further comprising, prior to commencing drilling, connecting a first end of the housing to the workpiece on which drilling is being performed and connecting a second end to a drilling machine such that the drill rod of the drilling machine extends through the bore.

10. The method of claim 8, wherein the drilling system further comprises a piston sleeve positioned in the bore and surrounding the drill rod, wherein the piston sleeve is configured to move longitudinally along the bore from a first position to a second position, and wherein in the second position, the piston sleeve engages with the secondary sealing element so as to place the secondary sealing element in the engaged position, wherein in the first position, the piston sleeve allows the secondary sealing element to be in the disengaged position, and wherein the step of moving the secondary sealing element to the engaged position comprises moving the piston sleeve from the first position to the second position.

11. The method of claim 10, wherein the secondary sealing element is an elastic element, which under longitudinal pressure, longitudinally compresses and radially expands, and when the longitudinal pressure is removed, longitudinally decompresses and radially contracts.

12. The method of claim 11, wherein in the first position, the piston sleeve applies pressure to the secondary sealing element sufficient to longitudinally compress and radially expand the secondary sealing element thus placing the secondary sealing element into the engaged position, and in the second position, the piston sleeve allows the secondary sealing element to be in the disengaged position.

13. The method of claim 12, wherein the step of moving the secondary sealing element to the engaged position further comprises:

decreasing a first pressure on a first portion of the piston sleeve and increasing a second pressure on a second portion of the piston sleeve so as to move the piston sleeve from the first position to the second position.

14. The method of claim 13, wherein the housing further comprises a first port and a second port, and wherein the decreasing to the first pressure is by fluid flow from the first portion of the piston sleeve through the first port, and the increasing of the second pressure is by fluid flow through the first port to the second portion.

15. The method of claim 14, further comprising, prior to commencing drilling, connecting a first end of the housing to a workpiece on which hot-tap drilling is being performed and connecting a second end to a drilling machine such that the drill rod of the drilling machine extends through the bore.

* * * * *